United States Patent [19]

Gerber

[11] Patent Number: 4,759,151
[45] Date of Patent: Jul. 26, 1988

[54] SEED PELLETS AND PROCESS FOR THEIR MANUFACTURE

[75] Inventor: Daniel Gerber, Muttenz, Switzerland

[73] Assignee: Séchoir la Courtine S.A., Les Genevez, Switzerland

[21] Appl. No.: 847,175

[22] PCT Filed: Jun. 3, 1985

[86] PCT No.: PCT/CH85/00091

§ 371 Date: Feb. 11, 1986

§ 102(e) Date: Feb. 11, 1986

[87] PCT Pub. No.: WO86/00001

PCT Pub. Date: Jan. 3, 1986

[30] Foreign Application Priority Data

Jun. 12, 1984 [CH] Switzerland .................... 2826/84

[51] Int. Cl.$^4$ .............................................. A01C 1/06
[52] U.S. Cl. .................... 47/57.6; 47/DIG. 9
[58] Field of Search ............ 47/57.6, DIG. 9, 58

[56] References Cited

U.S. PATENT DOCUMENTS 3,690,034  9/1972  Knapp .................... 47/57.6
3,698,133  10/1972  Schreiber .................... 47/57.6
4,272,417  6/1981  Barke et al. .................... 47/57.6 X
4,344,979  8/1982  Gago et al. .................... 47/57.6 X

FOREIGN PATENT DOCUMENTS 1033455  7/1958  Fed. Rep. of Germany .
2111754  9/1972  Fed. Rep. of Germany .

Primary Examiner—Robert E. Bagwill
Attorney, Agent, or Firm—Spencer & Frank

[57] ABSTRACT

The seed pellets have a core which contains grains of seed, organic substrate, loess, organic fertilizer, fungicides and, possibly, pesticides, and a wetting agent which promotes surface wettability. At least one bitter substance may also be present and made to cover the core in the form of a coat, or be distributed within the core. The core is furthermore provided, with a semipermeable coat, which consists of at least one starch and/or latex. The loess acts as a binding agent which serves to intimately bind the various constituents of the core to each other, and to act as a water storing agent in addition to the organic substrate. The semipermeable coat also contributes to the improvement and control of water conservation. Thus the pellets may be made to include sensitive seeds too which require much water for germination and/or may be sown in relatively dry regions and, furthermore, are resistant to breakage and abrasion.

24 Claims, No Drawings

SEED PELLETS AND PROCESS FOR THEIR MANUFACTURE

BACKGROUND OF THE INVENTION

The invention relates to seed pellets each containing at least one grain of seed and an organic substrate.

In Swiss patent specification No. 561 021 there was revealed a seed preparation (compound) produced by mixing 20 kg of poor-grade grass, so-called mulch, and 1 kg of crude cellulose flakes, and drying the mixture at a temperature of about 140° C. until the residual water content is only 15% by weight. The following substances are then added to this premixture, the percentages given representing % by weight, relative to the dried grass.

1.5% of 1,4 butanediol as hydrophilic constituent
2% of seed
0.25% of sodium alginate
0.25% of polyacrylic amide
0.25% of octylphenyl octoglycol ether
0.25% of fungicide
0.5% of nutrient salts This mixture can be compressed to moulded bodies, so-called pellets wherein the sodium alginate and polyacrylic amide act as binding agents.

According to Swiss patent specification No. 561 021 such pellets are provided with grass seeds and, in practice, with clover seed (leguminosa) too. These pellets, however, are not suitable for seeds which require relatively much water, and/or are sown in extremely dry areas, such as the seed of dry rice and of many other cultivated plants or forest seeds. The dried grass, of which the percentage by weight in the pellets is of the order of 90%, can give off only about one-third of this water content of about 15% by weight which exists therein, i.e., only about 5% of the weight of the dried grass. Furthermore, the pellets known lose relatively much water to the environment in a dry environment. A further disadvantage of the seed pellets according to Swiss patent specification No. 561 021 resides in the fact that the dried grass particles, seeds and other pellet constituents pressed to form pellets are held together only relatively loosely so that they break readily during transport and on sowing, and lose material through abrasion.

SUMMARY OF THE INVENTION

An object of the invention is to provide seed pellets which eliminate the disadvantages of the known seed pellets. The pellets are to be suitable particularly for applications where the seeds in the pellets require much water and/or where the pellets are to be sown in a relatively dry environment. Furthermore, the seed pellets are preferably to have high breaking strength and high resistance to abrasion.

This object is achieved by means of seed pellets of the aforedescribed type which are characterized according to the invention by containing loess. This object, moreover, is achieved by means of seed pellets characterized according to the invention in that they have a core containing at least the aforedescribed constituents and a semipermeable coat enclosing said core. Advantageous embodiments of the seed pellets are indicated in the relevant dependent claims relating to the seed pellets.

The invention, furthermore, relates to a method of producing seed pellets wherein seed pellets are formed from at least one seed and an organic substrate. The method according to the invention is characterized in that the organic substrate is mixed with loess before the seed pellets are pressed. The invention relates furthermore to a method of the aforedescribed type which is characterized according to the invention in that the cores formed of at least the aforementioned constituents, are covered by a semipermeable coat.

The organic substrate may be produced of non-woody plant material, advantageously also containing water, but being just dry enough to be ground well and/or crushed mechanically in some other manner, and then be mixed well in the form of particulate material with the seeds, loess and other desirable constituents, and finally agglomerated to agglomerated particles. The organic substrate may be formed, for example, of dried grass, straw and/or algae and/or leaf material. These raw plant materials are dried, in a drying device, unless they have already been sufficiently dried by natural drying processes, said drying device comprising for example a drying tower, in which hot air is passed through the plant material to be dried. The material for the organic substrate may be heated during the drying process or possibly in a separate sterilizing process to a temperature of at least about 100° C. and not more than about 180° C. and for example, to between 130° and 150° C., the material to be sterilized thereby. If the plant material should have been rendered too dry through natural drying processes, it is also possible to moisten the plant material, which could be done before and/or after the comminution. By drying and/or possibly moistening and comminuting the plant material, a particulate organic substrate can be formed, of which the water content is at least 10%, preferably at least 12%, but not more than 20%, preferably not more than 18% and, for example, about 15% of the total weight.

The plant material may be ground, for example, by using a beater mill to form particles of suitable sizes, and then be sifted, the excessively large and the excessively small particles being removable during the sifting process. In this manner a particulate, organic substrate of a more or less uniform particle size can be formed. The characteristic sizes for the substrate particles may be not more than 1 mm and preferably not more than about 0.5 mm, at least on the average, and preferably for the majority of the particles or even for all of the particles. The characteristic sizes for the organic substrate particles, furthermore, should be at least about 0,1 mm on an average, and preferably for the majority of the organic substrate particles or even for all of the particles, so that the particulate material will not behave like dust.

The loess used is preferably a degenerated loess. Degenerated loess is formed in surface earth areas where it is subjected to the action of organisms and is partially decomposed, so that it contains at least one natural nutrient and, in general, several such nutrients. It is possible to use such degenerated loess, as may be found, for example, to occur as overburden and waste product when processing loam or clay in the course of manufacturing brickworks products. Such loess which covers loam or claylike substances required for the production of brickworks products, has a consistency too low to be used for the production of brickworks products, and therefore may be obtained relatively cheaply. However, non-degenerated and more or less nutrient-free loess may also be used, in which case, however, relatively large quantities of fertilizer must be added. The loess may be sifted while it is produced, to remove excessively large lumps or other particles too large. The characteristic size for the loess particles may be not more than 0.1 mm and preferably not more than 0.05 mm, at least on the average, and preferably for the majority of the particles, or even for all of the particles. Loess possesses large particle surfaces suitable for water to adhere thereto, its ability to store water being the greater, the finer the loess, and the larger, correspondingly, its particle surface. Loess feels dry, much like a dry material, even if it contains relatively much water, and may therefore be mixed well with the organic plant substrate, the seeds and other desired constituents, even if its water content is relatively high. The water content of the loess used for forming the seed pellets should be at least about 10% and preferably at least 12% of the moist loess weight i.e., of the total loess weight. The water content of the loess can amount to not more than about 19 or 20% by weight or, it may even go as high as at most about 30% by weight. The loess collected may also be moistened and/or dried for forming the pellets.

The particulate organic plant substrate and the equally particulate loess and the seeds are intermixed for forming the seed pellets. At least one particulate fertilizer, such as an organic fertilizer, for example, guano is peferably added to this mixture. This fertilizer or part thereof may possibly be admixed to the loess before the loess is intermixed with the organic substrate. At least one fungicide, and advantageously a mixture of fungicides and/or possibly at least one pesticide, or a mixture containing several of these may be intermixed with the mixture. Furthermore, it is of advantage to admix a wetting agent to the mixture, the wetting agent consisting, for example, of at least one hydrophilic chemical and/or an algae derivative called aluginate, and to be provided for reducing the surface tension of the water coming into contact with the outer surfaces of the finished pellets, so that any water reaching the pellets, such as dew or rain drops, may rapidly and possibly uniformly spread across possibly large portions of the pellet surfaces.

The seeds, the organic substrate, the loess, the preferably provided fertilizer, the preferably provided fungicides and possibly pesticides and the preferably provided wetting agent may be intermixed by means of a mixing apparatus, so as to produce a possibly homogenous mixture. This mixture may be moulded, compressed and agglomerated by means of a pressing device called compactor to form pressed bodies or agglomerated particles each of these to contain at least one grain of seed, and preferably a number of grains of seed. The pressed bodies or agglomerated particles may contain, depending on the type and size of the grains of seed, at least 2, preferably at least 4 or up to not more than 15 grains of seed, the grains of seed to be distributed preferably uniformly over the entire volume of the pressed bodies or agglomerated particles. The water-containing loess acts as binding agent during and after compressing the pressed bodies or agglomerated particles, said binding agent being effective to relatively firmly bind the other constituents of the pressed bodies together and to itself. Since heat may be released during the pressing process it is necessary to design the pressing device and to carry out the pressing process in a manner to keep the temperature of the different constituents of the pressed bodies or agglomerated particles, and in particular the temperature of the grains of seed contained therein from ever exceeding 35° C. and preferably from ever exceeding 30° C., so that the germinating ability of the grains of seed will not be affected. Keeping the temperature low during pressing may contribute, moreover to keep the water losses low, so that the water contained in the organic substrate and the loess may be at least approximately the same after pressing, as it was before pressing.

After the pressed bodies or agglomerated particles have been pressed or possibly while they are being pressed, they may be cooled down again to normal room temperature of about 20° to 25° C., for example, by passing an air stream through them, or by just exposing them to ambient temperature.

To provide them protection against animals feeding on them, the seed pellets may be provided with at least one bitter, preferably non-poisonous substance, as commercially available as seed-protecting preparation (product). The bitter substance may be admixed to the mixture comprising the grains of seed, the organic substrate and the loess, before the pressed bodies or the agglomerated particles are pressed. However, it is also possible to advantageously apply the bitter substance partly or wholly, to the pressed bodies or agglomerated particles, after they have been produced, to make each such part form a core, having its entire surface covered with a coat containing the bitter substance. The core will then preferably have a lower concentration of bitter substance than the coat containing the bitter substance, or it may contain no bitter substance at all.

A second, outer, film-like coat to extend over the entire outer surface of the pellet and forming the outer boundary thereof may be applied to the preferably provided first, inner coat, containing the bitter substance, said outer coat to serve for influencing the passage of the substance across the outer surface of the finished seed pellet. This second coat should be semipermeable, so that water from the outside may penetrate through it into the core of the respective seed pellet, and that it may prevent, at least partially and preferably entirely, at least part of the water-soluble substances contained in the core, in particular the fungicides and/or pesticides, and preferably the nutrients too, and preferably all of the water-soluble constituents of the core, from leaving the pellet. Furthermore, the second coat should be enabled to inhibit and possibly prevent at least the escape of liquid water and preferably the escape of water vapour too from the pellet, at least in situations, in which the respective seed pellet is located in a dry environment. However, the second coat may be gas-permeable to a degree, to allow air required for the seed to germinate and for the germ-buds to grow, to penetrate from the outside into the pellet. In addition, the second coat must be made to interfere with the germ-buds growing out of the seed pellet, as little as possible. The second coat may consist, at least partially or entirely, of a porous material adapted to swell up in a moist environment and to make its pores widen, and to contract in a dry environment and to make the pores narrower and/or to close entirely. A material having such properties and referred to in the following as semipermeable material, may be, for example, a natural latex and/or at least one starch. Suitable starches are, for example, the starches of grain seed, such the albumen-rich grain starch and maize starches, or the starches from the seeds of carob, also known as St. John's bread.

When the pressed bodies are to be coated with the bitter substance, the latter substance may be dissolved, for example, in an aqueous solvent and sprayed onto the pressed bodies in the form of a solution, which may contain other additives. The bitter substance-like coat can then be obtained by drying the sprayed-on solution. The semipermeable material, i.e. the starch and/or latex may also be sprayed onto the pressed bodies in the form of a preferably aqueous solution, and then dried. Air may be passed for example through the sprayed pressed bodies, so as to dry the coats sprayed-on in solution.

An additional coat of bitter substance may be applied to the second semipermeable coat. One could even provide several coats, so that coats of bitter substance would alternate with semipermeable coats. It would also be possible to use an aqueous solution containing both the bitter substance and the semipermeable material, and spray it onto the pressed bodies and dry it subsequently. In this case a coat enclosing the core may be created, the coat containing the bitter substance and the semipermeable material. Should it be necessary or advantageous for the particular type of bitter substance and/or semipermeable material, they may be sprayed onto the pressed bodies in the form of a nonaqueous solution or a suspension, or applied in some other manner.

The percentage of the grains of seed relative to the weight of the pellet cores and relative to the but slightly greater total weight of the pellets may amount to about at least 0.5% or perhaps at least 1.5% up to not more than about 5% or not more than about 4% by weight. The water content of the organic substrate and of the loess in the completed pellets may be about equal to the respective values specified before for the respective raw materials. The percentage of weight the organic substrate and of the loess, relative to the total weight of the pellets depends, of course on the momentary water content of the organic substrate and of the loess, respectively, and may be about 30% or more and about 60% or less by weight of the cores or of the whole pellets. The percentage of the substrate and the loess, preferably each amounts to about 40% or more, and preferably about 55% or less by weight of the pellet cores or of the whole pellets. The percentage of the water-containing organic substrate may be, for example, about 44 to 48% and that of the water-containing loess about 46 to 50% by weight of the pellet cores or of the whole pellets. The percentage weight of the loess is thus, for example, approximately equal to and/or slightly larger than that of the organic substrate. The percentage of natural nutrients contained in a degenerated loess is dependent on the origin of the loess, and amounts to approximately 2% or less and usually to 1% or less by weight of the total loess. The percentage of the preferably organic fertilizer added may be at least about 1% by weight of the loess or at least about 0.5% by weight of the whole pellet, and not more than about 4% by weight of the loess or not more than about 2% by weight of the pellets, and, for example, not more than or approximately 2% by weight of the loess or approximately 1% or less by weight of the whole pellet, depending on the content of natural nutrient in the loess. The total percentage of nutrient resulting from the preferably present natural nutrient in the loess and the additionally added fertilizer may then be about 0.5 to 2.5% by weight and, for example, about 1% by weight of the whole pellet, which corresponds to about 2% by weight of the loess. The percentage of fungicides and pesticides, together, may be about 0,2 to 0,4% by weight of the cores or of the whole pellets.

The percentage of wetting agent may be typically at least 1% and, for example, at least 1.5% and not more than about 2% by weight of the cores or of the whole pellets. The percentage of bitter substance present in the cores and/or the coats may be at least about 0.1% not more than about 0.5% and preferably not more than 0.3% by weight of the cores or of the whole pellets. The percentage of semipermeable material may be at least 0.2% not more than 1% and, for example, about 0.4 to 0.6% by weight of the whole pellet, so that the percentage of the other constituents of the pellets may accordingly, be at least 99% and, for example, about 99.4 to 99.6% by weight of the whole pellet. If the semipermeable material forms a film-like coat by itself, i.e. without bitter substance, its thickness may be, for example, not more than about 0.1 mm or less.

The loess arranged to substitute for at least about half of the organic plant substrate of the pellets known from Swiss patent specification No. 561 021, is made to act both as binding agent and as water retainer. The loess is effective to create a firm and more abrasion-resistant bond of the pellet components, than the binding agent of the pellets disclosed in the Swiss patent specification No. 561 021; this may be attributed to the fact, that the percentage of loess contained in the pellets according to the invention may be made substantially larger than the percentage of binding agent present in the known pellets. However, the loess primarily possesses the advantage of very good water-retaining properties; it is not only able to absorb relatively much water, but to give off this water again almost entirely, more specifically up to a percentage amounting to about 2 to 3% of its own weight. When using a degenerated loess, as loess, as is preferably the case, the nutrients present in this loess will promote the growth of the germ-buds.

The semipermeable coat is also able to contribute to improving the water retention, by the fact, that its pores narrow or close in a dry environment, and widen in a moist environment. In addition, the water-soluble substances present in the pellet may produce an osmotic effect, so that in a dry environment not more than a small amount of water will leave the pellet through the semipermeable coat, while on wetting the pellet water can well penetrate into the pellet from the outside. In addition the coat may possibly contribute to improving the cohesion of the single pellets and their resistance to abrasion.

A substantial advantage of the present invention consists in that in addition to pellets including grass and clover seeds (as is known already), pellets which germinate well and include seed of many other wild and cultivated plants, such as forest seed, seed of dry rice, mealies, wheat, sesame and pulses may be produced Good results may be obtained when sowing the pellets in relatively dry areas. In addition, the pellets are resistant to breakage and abrasion during transport and, sowing.

DESCRIPTION OF THE PREFERRED EMBODIMENTS

The pellets according to the invention may have, for example, the following composition:
  2% by weight of seed of Bermuda grass
  48% by weight of natural, untreated, degenerated, water-containing loess, for example from "Bruderholz", a wooded area near Basle, Switzerland,
  1% by weight of fertilizer, namely Guano
  0.3% by weight of at least one fungicide and/or possibly a pesticide, for example of a fungicide/pesticide-mixed product produced by the firm Sandoz AG, Basle, Switzerland, under the trademark CAPTAFOL 1.5% by weight of a surface-active, hydrophilic wetting agent, for example of the chemical preparation (product) based on glycerin, obtainable under the trademark SANDOVIT from the firm Sandoz AG, Basle, Switzerland 0.3% by weight of a bitter substance, for example, a seed protection preparation (product) produced under the trademark CURB by the firm Sphere Laboratories (LONDON) Ltd., London, Great Britain, and distributed in Switzerland by the firm Plüss-Staufer AG, at Oftringen 5% by weight of natural latex as semipermeable material remainder (46.4% by weight) hay flour as organic substrate.

The grains of seed, the hay flour, the loess, the fertilizer, the fungicide and possibly the pesticides, the wetting agent and, optionally also all or part of the bitter substance were thoroughly intermixed with one another in a mixer. Pressed bodies weighing from of 3.5 to 7 g were then produced of this mixture by means of a pressing device comprising two form cylinders rotating in opposite directions. These pressed bodies were coated with the bitter substance, unless this substance had been introduced before into the mixture, and with latex. During the entire process of production of the pellets the temperature must never be allowed to exceed 30° C.

In another example the pellets had the following composition:

4% by weight of small graded maize seed 47.4% by weight of degenerated loess, for example from "Bruderholz" near Basle, Switzerland 0.3% by weight of the fungicides mentioned in the first example, and/or possibly the pesticides 1.5% by weight of the wetting agent mentioned in the first example 1% by weight of fertilizer, specifically Guano 0.3% by weight of the bitter substance mentioned in the first example 0.5% by weight of albumen-rich grain starch as semipermeable material remainder (45% by weight) of straw flour, for example maize straw, as organic substrate.

The pellets may be produced in a manner similar to that described in the first example, i.e., by first mixing the constituents serving for forming the cores preferably homogeneously, and then pressing and agglomerating the mixture in a pressing device called a compactor, to form pressed bodies or agglomerated particles. The bitter substance itself may be admixed to the mixture serving for forming the cores or may be applied, partially or entirely, as a coat to these cores, after the latter have been formed. The grain starch, on the other hand, is applied to the cores as a coat, so that the starch, possibly together with the bitter substance, will form a coating bounding the pellets on the outside.

The water contained in the organic substrate and the loess of the seed pellets produced in accordance with the above examples may lie within the previously specified ranges, and is selected to prevent the seeds from germinating, as long as the seed pellets are stored in a dry environment in an air-permeable packing, for example, in jute bags. The seed pellets may be sowed manually or mechanically or dispersed from an aeroplane. When the moisture in the environment of the pellets exceeds a specified limit, the pellet will absorb water, while at the same time the water content of the organic substrate and/or the loess may rise to the point of saturation. The seed will then start to germinate, while at the same time the bitter substances will prevent the germ-buds from being eaten by animals and the fungicides and/or the pesticides will protect the seed from fungi and similar parasites.

The pellets, of course, may be provided with a multitude of other types of seed in an analogous manner. Furthermore, the hay or straw flour specified as plant substrate in the two previous examples, may be substituted by ground algae or leaf material or by any non-woody plant substance. The bitter substance specified in said examples may be replaced, for example, a soja-based bitter substance. The pellets could also include as hydrophilic wetting agent, a fatty acid-glycerine-derivative and/or a formaldehyde resin and/or an algae derivative, called aluginate, in place of or in addition to the wetting agent specified in the examples.

I claim:

1. A seed pellet comprising a core and a semipermeable coat enclosing said core; wherein said core comprises at least two seed grains, and an organic substrate which comprises a non-woody plant material, loess, and a wetting agent; and wherein said semipermeable coat is adapted to allow water to penetrate from outside each said pellet into said core.

2. A seed pellet according to claim 1, wherein the proportion of loess is at least 30% by weight and not more than 60% by weight, and wherein the proportion of organic substrate is at least 30% by weight and not more than 60% by weight of the total seed pellet.

3. A seed pellet according to claim 1, wherein the loess is degenerated and contains at least one natural nutrient.

4. A seed pellet according to claim 1, further comprising at least one organic nutirent; at least one of a fungicide and pesticide; and a wetting agent for reducing the surface tension of water.

5. A seed pellet according to claim 4, wherein the proportion of the wetting agent is at least 1% by weight and not more than 2% by weight of the total seed pellet.

6. A seed pellet according to claim 1, further comprising at least one bitter substance.

7. A seed pellet according to claim 1, wherein the semipermeable coat comprises one of latex and at least one starch.

8. A seed pellet according to claim 1, wherein the proportion of the semipermeable material present in the semipermeable coat is at least 0.2% by weight, and is not more than 1% by weight.

9. A seed pellet according to claim 1, wherein at least one of the non-woody plant material and the loess further comprise absorbed water.

10. A seed pellet according to claim 9, wherein the water content of the organic substrate is at least 10% by weight and at most 20% by weight, and the water content of the loess is at least 10% by weight and at most 20% by weight.

11. A seed pellet according to claim 1, wherein the organic substrate comprises at least one of grass, straw, algae and leaf material.

12. A seed pellet according to claim 1, wherein the core comprises at least four seed grains.

13. A seed pellet according to claim 1, wherein the proportion of loess is at least 40% by weight and not more than 55% by weight of the total seed pellet.

14. A seed pellet according to claim 1, wherein the semipermeable coat further comprises a non-poisonous bitter substance.

15. A seed pellet according to claim 1, wherein both the core and the coat additionally comprise a non-poisonous bitter substance.

16. A seed pellet according to claim 1, wherein the coat comprises a porous material adapted to swell up in a moist environment making its pores wider, and to contract in a dry environment making the pores narrower, so that water from the outside of the pellet may penetrate through the coat into the core on wetting, and that the escape of water out of the core is inhibited in a dry environment.

17. A seed pellet according to claim 1, comprising at least 1.5% by weight of seed and having a weight of at least 3.5 grams.

18. A seed pellet comprising a core and a semipermeable coat enclosing said core, wherein the core comprises a mixture of 1.5% by weight to 4% by weight of seed, 0.2% to 0.4% by weight of at least one of a fungicide and pesticide, 1.5% to 2% by weight of a wetting agent, 44% to 48% by weight of organic substrate, 46% to 50% by weight of degenerated loess and organic nutrient, and 0.1% to 0.3% by weight of a non-poisonous bitter substance, wherein all percentages refer to the whole pellet, and wherein the coat is adapted to inhibit the escape of water out of the core in a dry environment and to let water penetrate from the outside into the core on wetting.

19. A seed pellet according to claim 18, wherein the core further comprises at least two seed grain, wherein the organic substrate comprises non-woodened plant material, and wherein the loess is degenerated and contains at least one organic nutrient.

20. Method of producing a seed pellet, comprising the steps of preparing a mixture by intermixing grains of seed, an organic substrate comprising non-woody plant material, loess, a wetting agent and at least one of a fungicide and pesticide; pressing the mixture to form a core comprising at least two seed grains; and providing said core with a semipermeable coat adapted to inhibit the escape of water out of the core in a dry environment and to let water penetrate into the core on wetting.

21. Method according to claim 20, further comprising the step of drying the plant material before the preparation of the mixture.

22. Method according to claim 20, wherein preparing the mixture comprises the additional step of forming the organic substrate by grinding at least one of grass, straw, algae and leaf material.

23. Method according to claim 20, wherein pressing the mixture to form the core is accomplished by means of rotating form cyclinders.

24. Method according to claim 20, wherein providing the coat is accomplished by spraying a liquid material onto the core followed by drying said sprayed core.

* * * * *